(12) United States Patent
Fujikawa

(10) Patent No.: US 8,068,350 B2
(45) Date of Patent: Nov. 29, 2011

(54) SHEET METAL MEMBER, INFORMATION DISPLAY APPARATUS, AND PANEL UNIT MANUFACTURING METHOD

(75) Inventor: Hideyuki Fujikawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 514 days.

(21) Appl. No.: 12/230,386

(22) Filed: Aug. 28, 2008

(65) Prior Publication Data

US 2009/0140121 A1   Jun. 4, 2009

(30) Foreign Application Priority Data

Nov. 29, 2007   (JP) .................................. 2007-308873

(51) Int. Cl.
*H05K 7/02*   (2006.01)
(52) U.S. Cl. .......................................... 361/810; 29/844
(58) Field of Classification Search .................. 361/810; 29/844–845
See application file for complete search history.

(56) References Cited

U.S. PATENT DOCUMENTS

| 4,557,457 A | * | 12/1985 | Cockfield et al. ............. 248/544 |
| 6,840,272 B2 | * | 1/2005 | Hildreth, Jr. .................. 137/545 |
| 7,595,983 B2 | * | 9/2009 | Okuda ...................... 361/679.56 |
| 2007/0053144 A1 | * | 3/2007 | Nakatani et al. .............. 361/680 |
| 2008/0084673 A1 | * | 4/2008 | Hsiung .......................... 361/724 |

FOREIGN PATENT DOCUMENTS

| JP | 05-274986 | 10/1993 |
| JP | 08-187148 | 7/1996 |
| JP | 2000-145041 | 5/2000 |

* cited by examiner

*Primary Examiner* — Jeremy Norris
(74) *Attorney, Agent, or Firm* — Staas & Halsey LLP

(57) ABSTRACT

A sheet metal member has a first through hole formed at such a position as to be in communication with a screw hole formed in a side surface of a panel, and is fixed to the panel by being screwed using the first through hole and the screw hole. The sheet metal member further has hole a bending piece in which a second penetration is formed and on which a bending processing is performed at such an overlapping position that the second through hole overlaps with the first through hole, and is screwed to the panel in either of, according to a type of the panel, an open state in which the bending processing has not yet been performed on the bending piece or a bent state in which the bending processing has been performed on the bending piece at the overlapping position.

14 Claims, 14 Drawing Sheets

SHEET METAL MEMBER, INFORMATION DISPLAY APPARATUS, AND PANEL UNIT MANUFACTURING METHOD

BACKGROUND OF THE INVENTION

1. Field of the Invention

The present invention relates to a sheet metal member to be screwed to a panel having a screw hole formed in a side surface thereof, an information display apparatus having a display panel fixed to a sheet metal member, and a panel unit manufacturing method of manufacturing a panel unit by screwing a sheet metal member to a panel.

2. Description of the Related Art

In a field of personal computers, an apparatus is required to be made smaller and lighter, and also required to have a larger display panel at the same time. In order to realize such requirements, for example, a display apparatus using a thin and light liquid crystal panel is applied, and a light source, a control circuit board, and the like are arranged on a back side rather than adjacent to the liquid crystal panel so that a display screen is spread out by the amount of narrowed clearance between a casing and the liquid crystal panel. The liquid crystal panel, the control circuit board for controlling the liquid crystal panel, and the like tend to be easily damaged due to a shock and the like. Thus, the liquid crystal panel and the control circuit board are usually held together onto the sheet metal member and the sheet metal member is fixed to a main body casing so that a strength is enhanced.

Now, manufacturers manufacturing personal computers do not manufacture liquid crystal panels on their own. In general, the manufacturers purchase the liquid crystal panels already manufactured from specialized manufacturers and install the liquid crystal panels in electronic devices. In many cases, the liquid crystal panels are obtained from multiple manufacturers, and accordingly, personal computers of a same model may be sometimes equipped the liquid crystal panels of different manufacturers.

However, large liquid crystal panels have been recently developed one after another, and it is a reality that the depth and the like of screw holes for sheet metal members to be attached to the liquid crystal panels, the sizes of the liquid crystal panels, and the like have not yet standardized among the multiple manufacturers manufacturing the liquid crystal panels. Accordingly, even among the liquid crystal panels having the same external size, the depth of the screw holes and the like may slightly differ among multiple types of liquid crystal panels manufactured respectively by multiple manufacturers. Thus, manufacturers manufacturing personal computers need to prepare sheet metal members and screws appropriate for screw holes of each of the multiple types of liquid crystal panels respectively, and there exists problems that the cost is increased and management of parts becomes cumbersome.

Concerning this point, a metal sheet member is formed with an elongated hole that overlaps with multiple screw holes each arranged on each of the multiple types of liquid crystal panels, and screwing is done at a precise position using a jig and the like. Furthermore, Japanese Patent Application Publication No. H5-274986 discloses a thermal relay enabling commonality of parts by moving a gang moving plate having slits according to the size of each of multiple devices.

However, a method of fixing with screws using a jig is troublesome and takes time, thus leading to an increase in cost. In a case where the technique disclosed in Japanese Patent Application Publication No. H5-274986 is attempted to be used, there exist a problem that the cost is increased because it requires a special sheet metal member arranged with a slit of a separate member and a problem that it becomes troublesome to assemble parts because a position of the slit must be fine adjusted according to the screw hole of the liquid crystal panel.

SUMMARY OF THE INVENTION

The present invention has been made in view of the above circumstances and provides a sheet metal member, an information display apparatus, and a panel unit manufacturing method that suppress an increase in cost and enables commonality of parts among the multiple types of display panels having screw holes whose depths are different from each other.

A sheet metal member according to a basic feature of the invention includes:

a first through hole formed at such a position as to be in communication with a screw hole formed in a side surface of a panel, wherein the sheet metal member is fixed to the panel by being screwed using the first through hole and the screw hole, the sheet metal member further includes a bending piece in which a second through hole is formed and on which a bending processing is performed at an overlapping position where the second through hole overlaps with the first through hole; and the sheet metal member is screwed to the panel in either of, according to a type of the panel, an opened state in which the bending processing has not yet been performed on the bending piece or a bent state in which the bending processing has been performed on the bending piece at the overlapping position.

In the basic feature of the sheet metal member, the sheet metal member has a first through hole in communication with a screw hole of a panel, and also has a second through hole overlapping with the first through hole upon a bending processing being performed. The sheet metal member is screwed using only the first through hole with a bending piece left opened in a case where the screw hole arranged on the panel is deep, and the sheet metal member is screwed while the first through hole overlaps with the second through hole after the bending processing is performed on the bending piece in a case where the screw hole arranged on the panel is shallow, so that a commonality of the sheet metal member, the screw, and the like can be achieved between the multiple panels. In the basic feature of the sheet metal member, a separate plate member and the like other than the sheet metal member are not required to be prepared, and accordingly, an increase in the cost can be suppressed, and a depth of the screw hole can be easily adjusted to a length of the screw by just bending the bending piece according to a type of the panel.

In the basic feature, it is preferable that the sheet metal member has a first mark inscribed at a position where the first mark is hidden by the bending piece in the bent state.

According to this additional feature, the first mark is concealed when the bending processing is performed on the bending piece, and thus, a processing condition of the bending piece can be easily recognized.

In the sheet metal member according to the present invention, preferably, the sheet metal member has a second mark inscribed at a position of the bending piece in the bent state at which position the second mark is exposed on a surface in the bent state.

According to this additional feature, the second mark is exposed when the bending processing is performed on the bending piece, and thus, a processing condition of the bending piece can be easily recognized.

In the basic feature, it is preferable that the panel is a display panel having a display screen displaying information, and wherein the sheet metal member is screwed to the side surface of the panel and is a member extending on a back surface side of the display screen.

A display panel is often obtained from multiple manufacturers and mounted in an electronic device and the like. According to this additional feature, a commonality of the sheet metal member can be achieved among multiple types of display panels even though the depths of the screw holes are different, so that an increase in the cost can be suppressed.

In the basic feature, it is preferable that the first through hole is an elongated hole in which portions of two circular holes having diameters through which screws pass are overlapped with each other, the elongated hole having a narrowed portion, at a center thereof, having a narrow width so as to block a passage of the screws, and the second through hole is, in the bent state, is in communication with a first circular hole that is one of the two circular holes forming the first through hole, and the bending piece covers a second circular hole that is the other thereof.

In this preferred additional feature, with one type of sheet metal member, it is possible to cope with not only the depth of the screw hole arranged on each of two types of panels but also a displacement of the position of the screw hole.

For the additional feature in which portions of the two circular holes of the first through hole are overlapped with each other, it is further preferable that the second through hole is an elongated hole having a longer axis in a direction to intersect with a longer axis of the first through hole.

The second through hole is an elongated hole having a longer axis in a direction to intersect with a longer axis of the first through hole, and thus, variation of a bending accuracy of the bending piece can be absorbed.

An information display apparatus according to a basic feature of the invention includes:

a display panel that has a display screen displaying information and that has a screw hole formed in a side surface;

a sheet metal member that has a first through hole formed at such a position as to be in communication with the screw hole of the display panel and that is fixed to the display panel by being screwed using the first through hole and the screw hole; and a main body casing in which the display panel fixed to the sheet metal member is housed, wherein the sheet metal member further includes a bending piece in which a second through hole is formed and on which a bending processing is performed at an overlapping position where the second through hole overlaps with the first through hole; and the sheet metal member is screwed to the display panel in either of, according to a type of the display panel, an opened state in which the bending processing has not yet been performed on the bending piece or a bent state in which the bending processing is performed on the bending piece at the overlapping position.

In the basic feature of an information display apparatus, an increase in the cost can be suppressed, and a commonality of the sheet metal member can be enabled between multiple types of display panels.

In the information display apparatus according to this basic feature, it is preferable that the information display apparatus has a screw commonly used for screwing the display panel in either of the opened state in which the bending processing has not yet been performed on the bending piece of the sheet metal member or the bent state in which the bending processing is performed on the bending piece at the overlapping position.

In this preferred additional feature, one type of screw can be commonly used for multiple types of display panels whose screw holes are different in depth, and thus, an increase in the cost can be further suppressed.

In the information display apparatus according to this basic feature, it is preferable that the sheet metal member has a first mark inscribed at a position where the first mark is hidden by the bending piece in the bent state.

This additional feature makes it possible to readily see the state of the processed bending piece.

In the information display apparatus according to the present invention, preferably, the sheet metal member has a second mark inscribed at a position of the bending piece in the bent state at which position the second mark is exposed on a surface in the bent state.

It is possible to readily see the state of the processed bending piece by checking whether the second mark is exposed or not.

In the information display apparatus according to the present invention, preferably, the first through hole is an elongated hole in which portions of two circular holes having diameters through which screws pass are overlapped with each other, the elongated hole having a narrowed portion, at a center thereof, having a narrow width so as to block a passage of the screws, and the second through hole, in the bent state, is in communication with a first circular hole that is one of the two circular holes forming the first through hole, and the bending piece covers a second circular hole that is the other thereof.

This additional feature makes it possible to support both of the depth and the displacement of the through holes formed in two kinds of panels, by using a single metal plate member.

Further, it is preferable that the second through hole is an elongated hole having a longer axis in a direction to intersect with a longer axis of the first through hole.

This additional feature makes it possible to absorb displacement in terms of bending precision of the bending piece.

A panel unit manufacturing method according to the present invention is a method of manufacturing a panel unit by screwing a panel having a screw hole formed in a side surface and a sheet metal member having a first through hole formed at such a position as to be in communication with the screw hole of the panel, using the first through hole and the screw hole, wherein the sheet metal member further includes a bending piece in which a second through hole is formed and on which a bending processing is performed at an overlapping position where the second through hole overlaps with the first through hole; and according to a type of the panel, either of a first screwing step or both of a bending processing step and a second screwing step is performed, wherein the first screwing step is a step of screwing the sheet metal member to the panel in an opened state in which the bending processing has not yet been performed on the bending piece, the bending processing step is a step of performing the bending processing on the bending piece at the overlapping position, and the second screwing step is a step of screwing to the panel the sheet metal member in the bent state obtained through the bending processing step.

In the basic feature of the panel unit manufacturing method, the depth of the screw hole can be easily adjusted to the length of the screw by just bending the bending piece according to the type of the panel.

In the panel unit manufacturing method according to the present invention, preferably, the bending processing step is a step of performing the bending processing on the bending piece and marking a second mark at such a position of the bending piece in the bent state at which position the second mark is exposed on a surface in the bent state.

In the preferred panel unit manufacturing method, a second mark showing that the bending processing has been performed on the bending piece can be marked without increasing new steps.

As described above, in the basic feature of the sheet metal member, the information display apparatus, and the panel unit manufacturing method, an increase in the cost can be suppressed, and a commonality of parts can be achieved between multiple types of display panels whose screw holes are different in depth and the like from each other, according to the basic feature of a part assembly and an electronic device.

DETAILED DESCRIPTION OF THE INVENTION

Embodiments of the sheet metal member, the information display apparatus, and the panel unit as described above will be hereinafter described with reference to figures.

Figure 1:
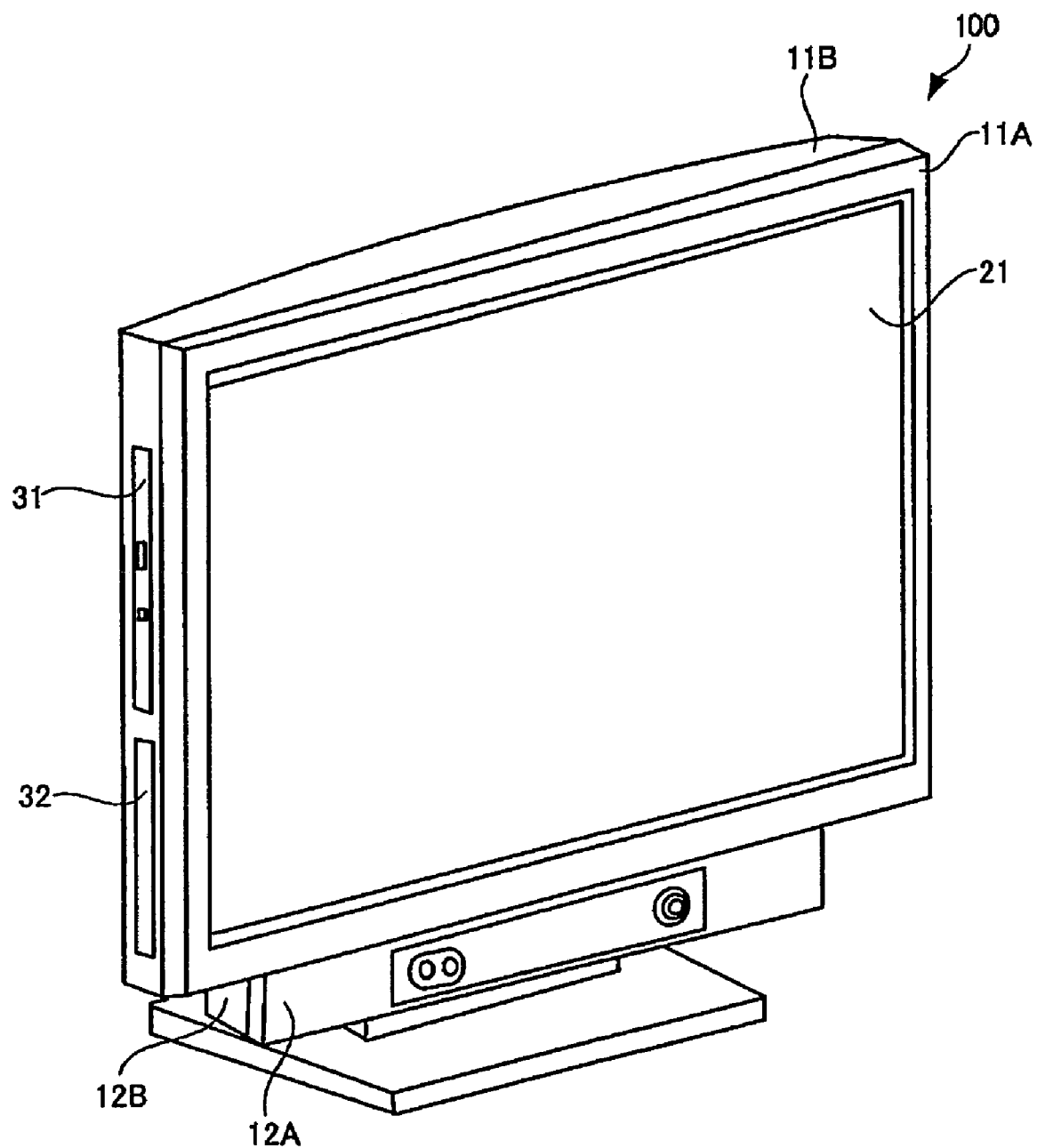
FIG. 1 is an external view of a personal computer, i.e., a first embodiment of the information display apparatus.

FIG. 1 is an external view of a personal computer 100, i.e., a first embodiment of the information display apparatus.

The personal computer 100 is an all-in-one personal computer in which a display device displaying information and a hard disk device, a CPU, and the like are mounted together in a same casing. It should be noted that in reality, a keyboard, a mouse, and the like are connected to the personal computer 100 but are omitted from showing in FIG. 1.

FIG. 1 shows a figure of the personal computer 100 viewed from the front. In the personal computer 100, a liquid crystal panel having a display screen 21 extending on a surface thereof, a CPU, a hard disk device, a cooling fan, a power source device, various circuit boards, cables and the like connecting therebetween are housed in a space defined by an upper front case 11A, an upper rear case 11B, a lower front case 12A, and a lower rear case 12B. A combination of the upper front case 11A, the upper rear case 11B, the lower front case 12A, and the lower rear case 12B corresponds to an example of the main body casing according to the basic feature of the information display apparatus as described above.

A front surface of the personal computer 100 is arranged with a startup switch 34a for starting the personal computer 100, a display switch 34b for displaying information on the display screen 21 and the like. A side of the personal computer 100 is arranged with an optical disk loading slot 31 for loading an optical disk such as a CD, a DVD, and the like and an FD loading slot 32 for loading a flexible disk (hereinafter referred to as an "FD").

Figure 2:
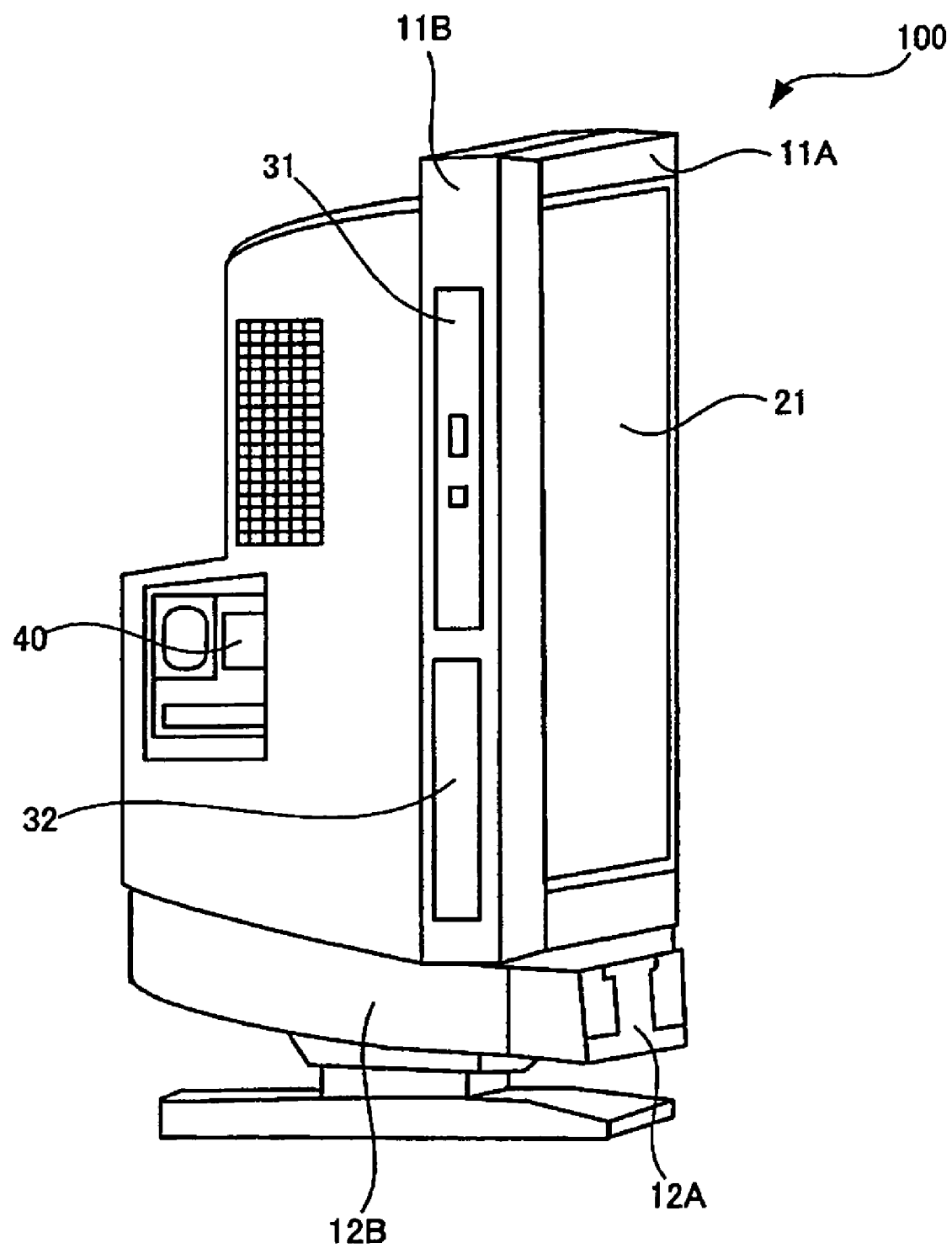
FIG. 2 is a side view of the personal computer.
Figure 3:
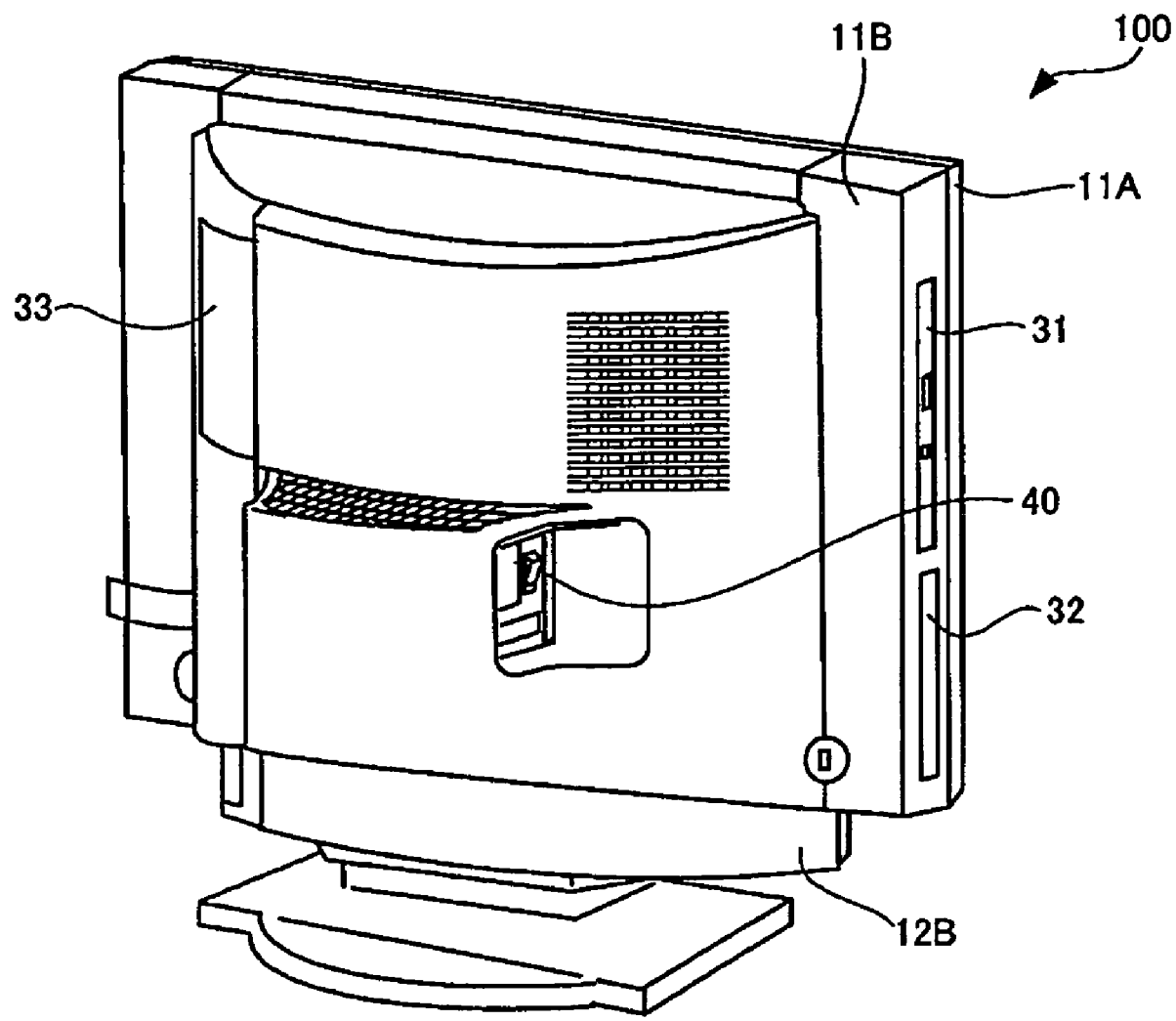
FIG. 3 is a back view of the personal computer.

FIG. 2 is a side view of the personal computer 100. FIG. 3 is a back view of the personal computer 100.

In the personal computer 100, the upper rear case 11B is attached to the upper front case 11A, and the lower rear case 12B is attached to the lower front case 12A. The liquid crystal panel is fitted onto the upper front case 11A with the display screen 21 facing the front, and the hard disk device and the various circuit boards are contained in a back side of the display screen 21. The display screen 21 corresponds to an example of the display screen according to the basic feature of the information display apparatus. A back surface of the personal computer 100 is arranged with a main power switch 40 for turning on a power source and an expansion card installation slot 33 for installing an expansion card for expanding functions such as a LAN card and the like.

Figure 4:
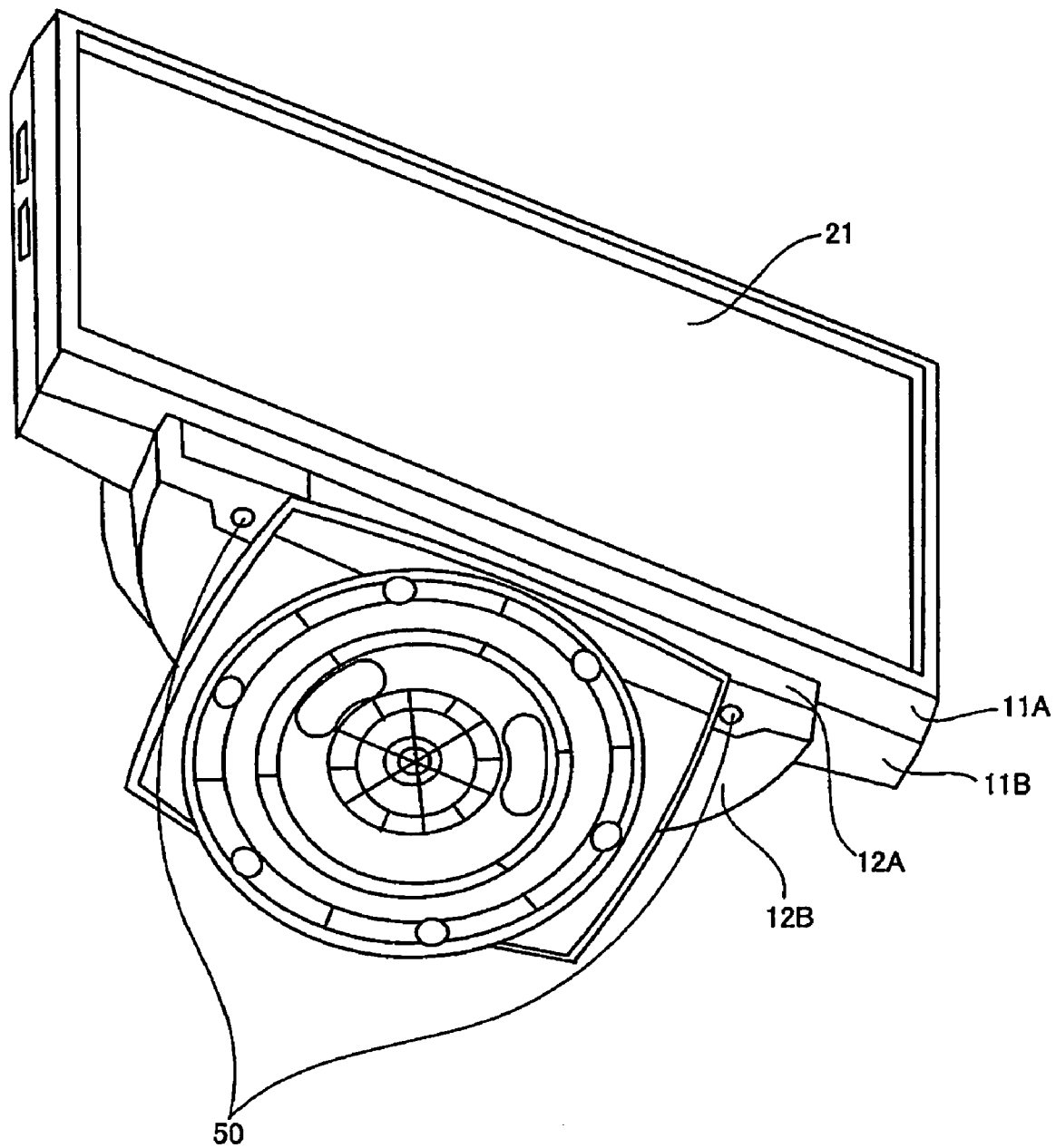
FIG. 4 is a bottom view of the personal computer.

FIG. 4 is a bottom view of the personal computer 100.

The replaceable hard disk device and the like are contained in an upper portion in an inside of the personal computer 100. The circuit boards usually not replaced are protected by a casing frame and contained in a lower portion therein. For example, the lower front case 12A is a replaceable plastic cover, a printed circuit board is attached to a metal casing frame (see, FIG. 10), and the casing frame is fixed to the lower front case 12A with screws 50. In a normal repair, only the upper rear case 11B is detached from the upper front case 11A, so that, for example, the hard disk device contained in the upper portion in the inside of the personal computer 100 is replaced.

Figure 5:
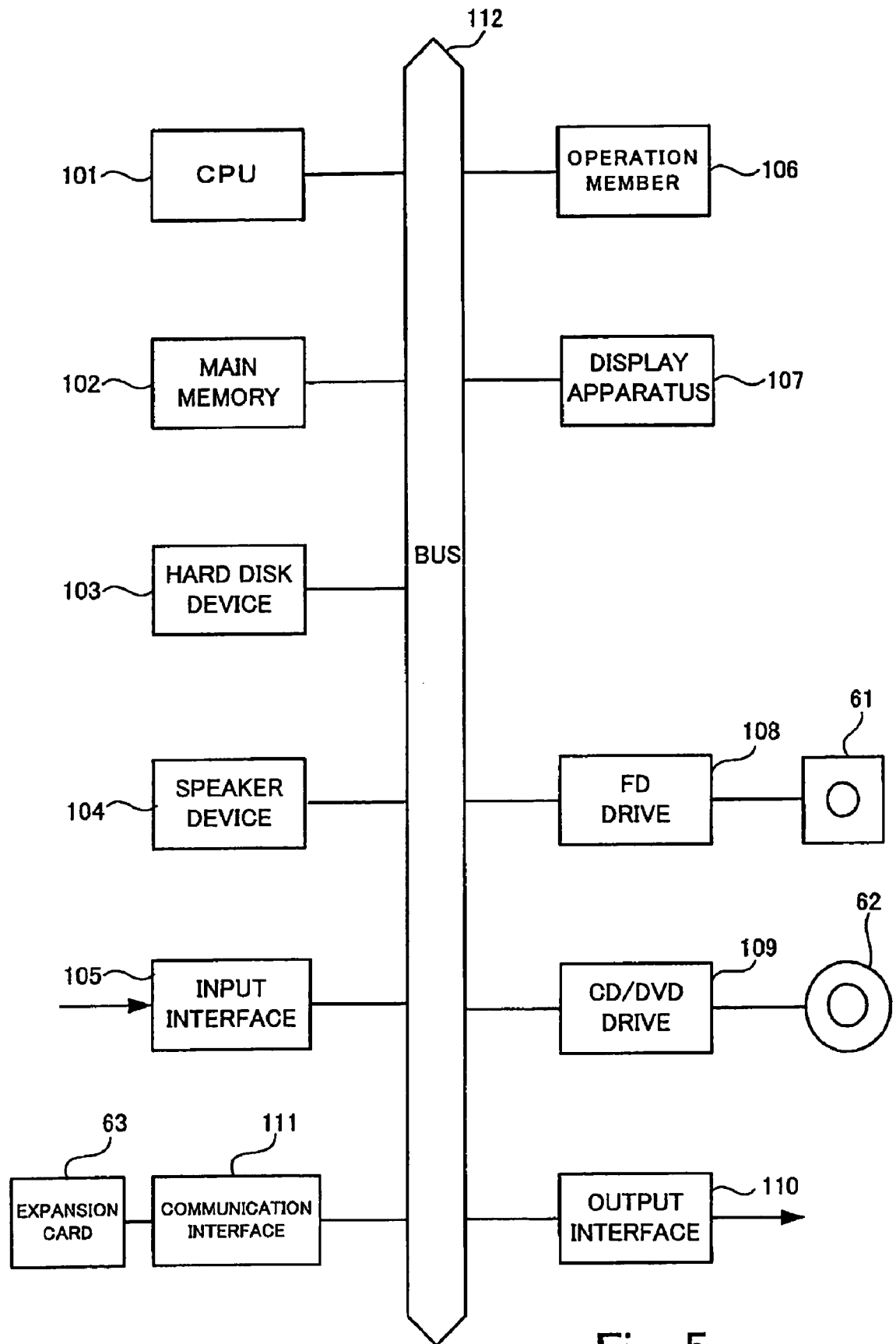
FIG. 5 is an internal configuration diagram of the personal computer.

FIG. 5 is an internal configuration diagram of the personal computer 100.

As shown in FIG. 5, the personal computer 100 has a CPU 101 executing various programs, a main memory 102 in which a program stored in a hard disk device 103 is read out and expanded to be executed by the CPU 101, the hard disk device 103 storing various programs, data, and the like, a speaker device 104 generating a sound signal and outputting sound, an input interface 105 inputting data from an external apparatus, an operation member 106 including a keyboard, a trackpad, and the like, a display device 107 displaying information on the display screen 21, an FD drive 108 into which an FD 61 is loaded and which accesses the loaded FD 61, a CD/DVD drive 109 into which a CD-ROM 62 or a DVD is loaded and which accesses the loaded CD-ROM 62 or the loaded DVD, an output interface 110 outputting data to an external apparatus, and a communication interface 111 performing communication using an expansion card 63. These various elements are connected to each other via a bus 112.

Herein, any one of multiple types of liquid crystal panels obtained from multiple manufacturers is mounted to the personal computer 100. The sheet metal member for enhancing strength is fixed to the liquid crystal panel, and the sheet metal member absorbs the difference of the depth of the screw holes between each of the multiple types of liquid crystal panels. A method of screwing the liquid crystal panel and the sheet metal member will be hereinafter described in detail.

Figure 6:
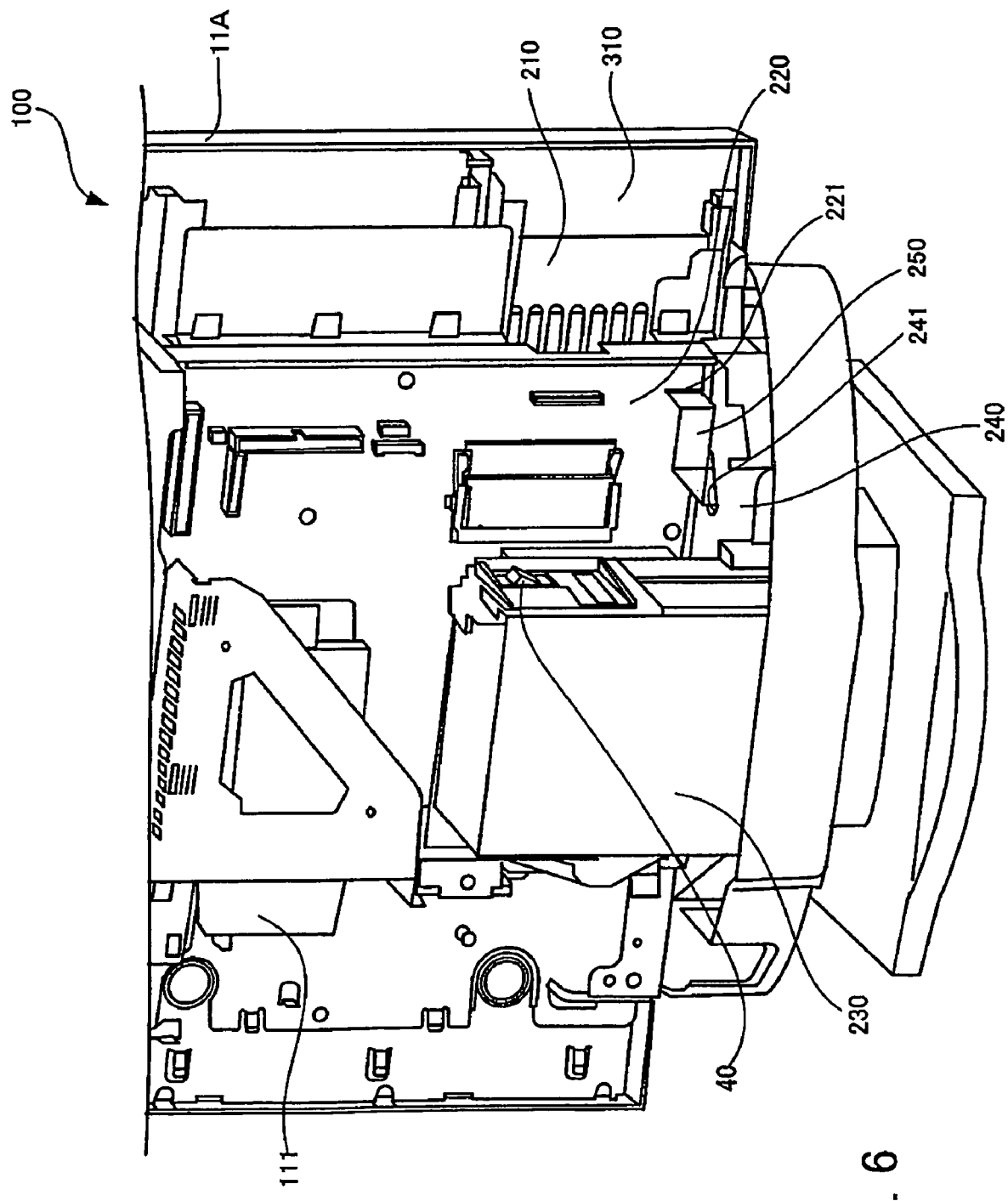
FIG. 6 is a back view of the personal computer from which the upper rear case is removed.

FIG. 6 is a back view of the personal computer 100 from which the upper rear case 11B is removed.

As shown in FIG. 6, a liquid crystal panel 210 is held by a sheet metal member 310 made of metal, the sheet metal member 310 is fixed to the upper front case 11A with the display screen 21 of the liquid crystal panel 210 facing the front. The liquid crystal panel 210 corresponds to an example of the panel according to the basic feature described above, and also an example of the display panel according to the additional feature described above. The sheet metal member 310 corresponds to an example of the sheet metal member according to the basic feature described above. The liquid crystal panel 210 and the sheet metal member 310 constitute a panel unit.

A communication interface 111 shown also in FIG. 5, a main circuit board 220 on which the hard disk device 103 and the like are mounted, a power source device 230 controlling an electric power, and the like are overlappingly arranged on the back side of the liquid crystal panel 210. The personal computer 100 is separated into an upper portion and a lower portion by a separation frame 240 as a part of the casing frame. The printed circuit board on which the speaker device 104 (see, FIG. 5) and various switches 33a, 34b and the like (see, FIG. 1) are mounted is contained below the separation frame 240. The main circuit board 220 and the printed circuit board are connected by a flat cable 250. Terminals on one end of the flat cable 250 are attached to a connecter 221 of the main circuit board 220. Terminals on the other end thereof pass through a through hole 241 arranged on the frame 240 and is attached to the printed circuit board.

Figure 7:
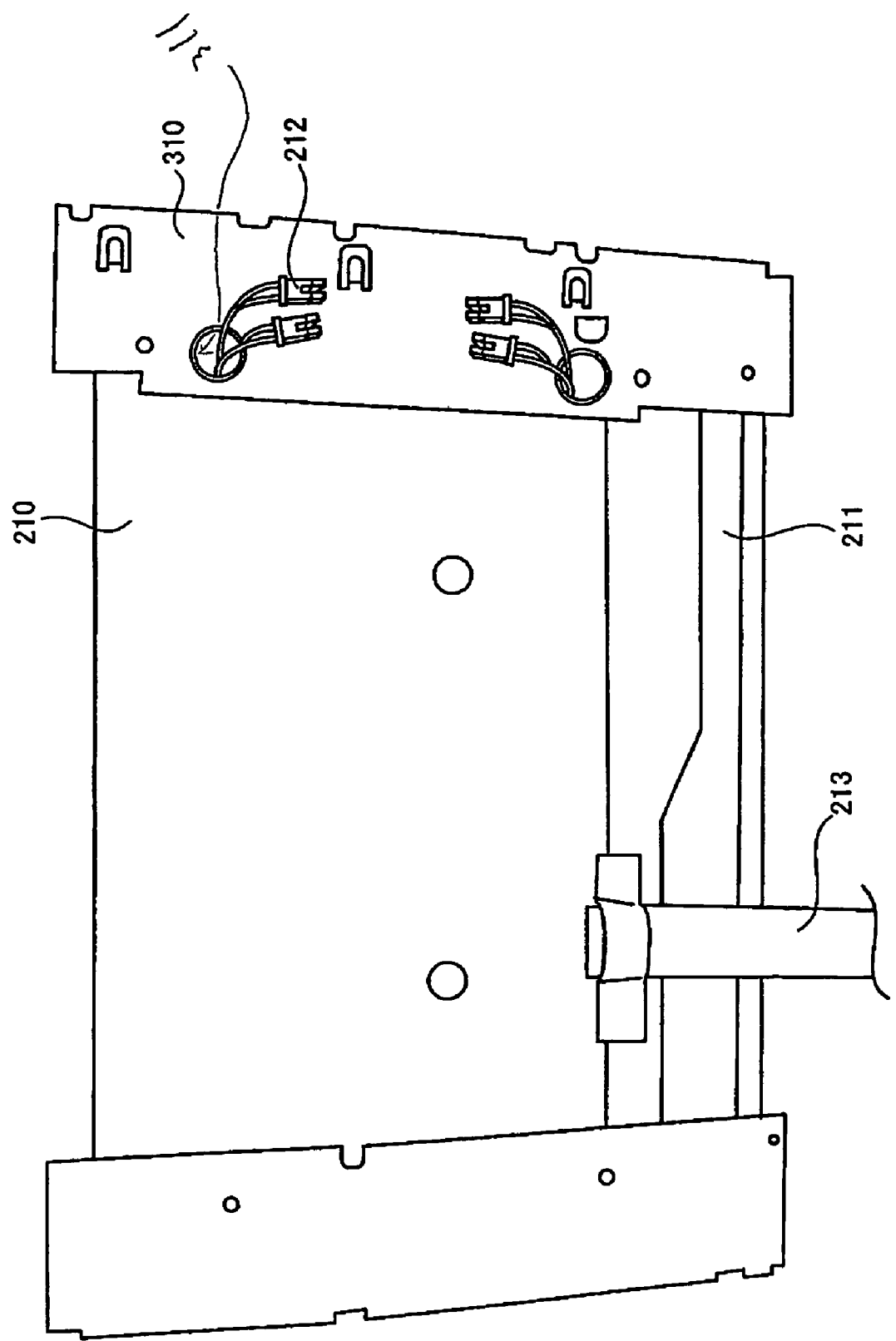
FIG. 7 is a back view of the liquid crystal panel and the sheet metal member detached from the upper rear case.

FIG. 7 is a back view of the liquid crystal panel 210 and the sheet metal member 310 in a state in which they are detached from the upper rear case 11B.

As shown in FIG. 7, a control circuit board 211 controlling the liquid crystal panel 210 is bent and overlapped on the back side of the liquid crystal panel 210, and the sheet metal member 310 is fixed to both ends of the liquid crystal panel 210 and the control circuit board 211. The sheet metal member 310 has wiring holes 311 through which a cable 212 extending from the liquid crystal panel 210. The cable 212 passing through the wiring hole 311 to the back side of the sheet metal member 310 and the flat cable 213 extending from the control circuit board 211 are connected to the printed circuit board hidden beneath the separation frame 240 shown in FIG. 6.

Figure 8:
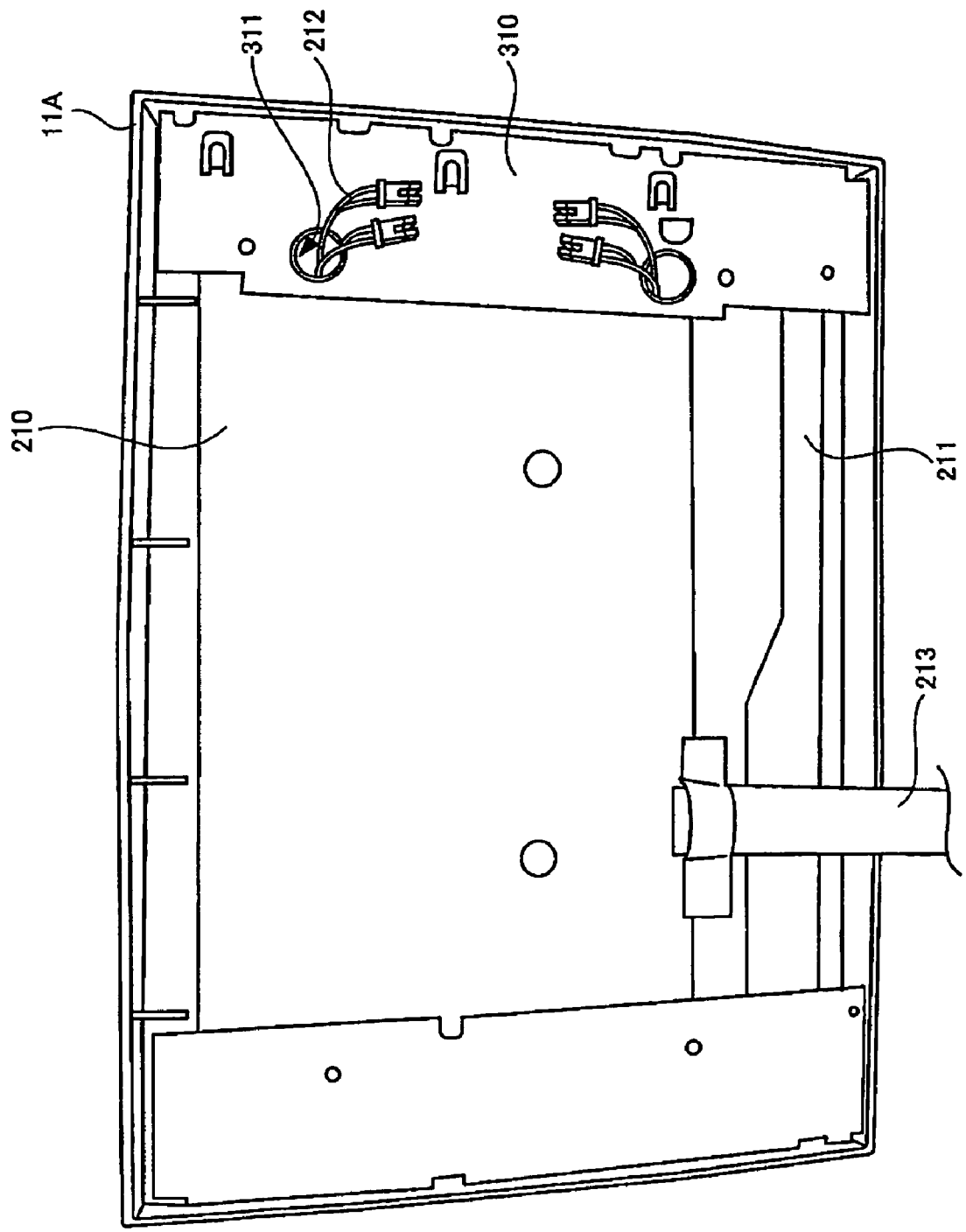
FIG. 8 is a back view of the liquid crystal panel and the sheet metal member attached to the upper rear case.
Figure 9:
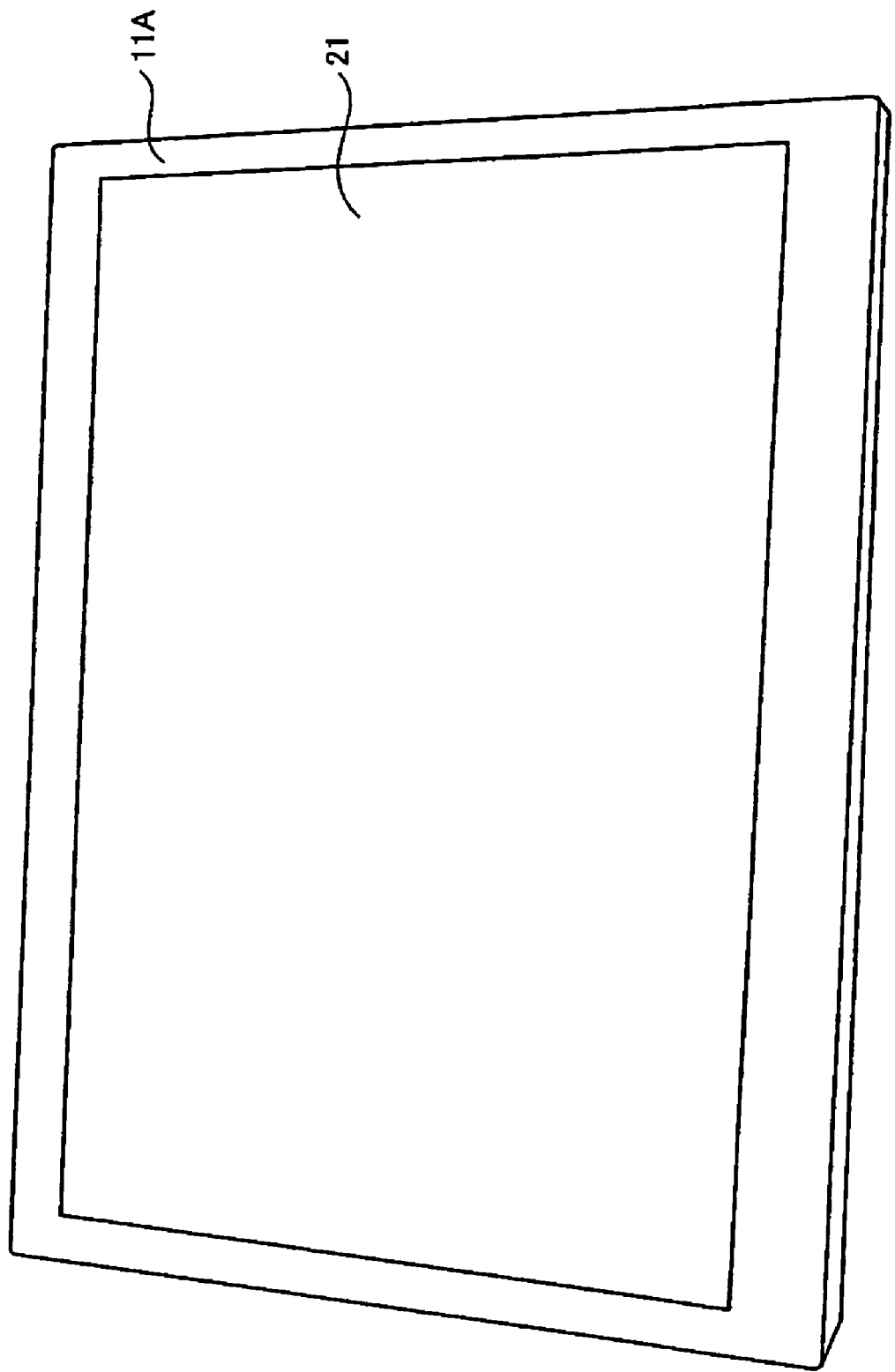
FIG. 9 is a front view of the liquid crystal panel and the sheet metal member attached to the upper rear case.

FIG. 8 is a back view of the liquid crystal panel 210 and the sheet metal member 310 attached to the upper rear case 11B. FIG. 9 is a front view of the liquid crystal panel 210 and the sheet metal member 310 attached to the upper rear case 11B.

As shown in FIG. 8, the sheet metal member 310 is fixed to hold both edge portions of the liquid crystal panel 210 and the control circuit board 211, and the sheet metal member 310 is fitted onto the upper rear case 11B. As shown in FIG. 9, the sheet metal member 310 is hidden by the upper rear case 11B when viewed from the surface side on which the display screen 21 is arranged.

As described above, the liquid crystal panel 210 is obtained from the multiple manufacturers, and the sheet metal member 310 and the screws are used that are common between the multiple types of liquid crystal panels 210.

Figure 10:
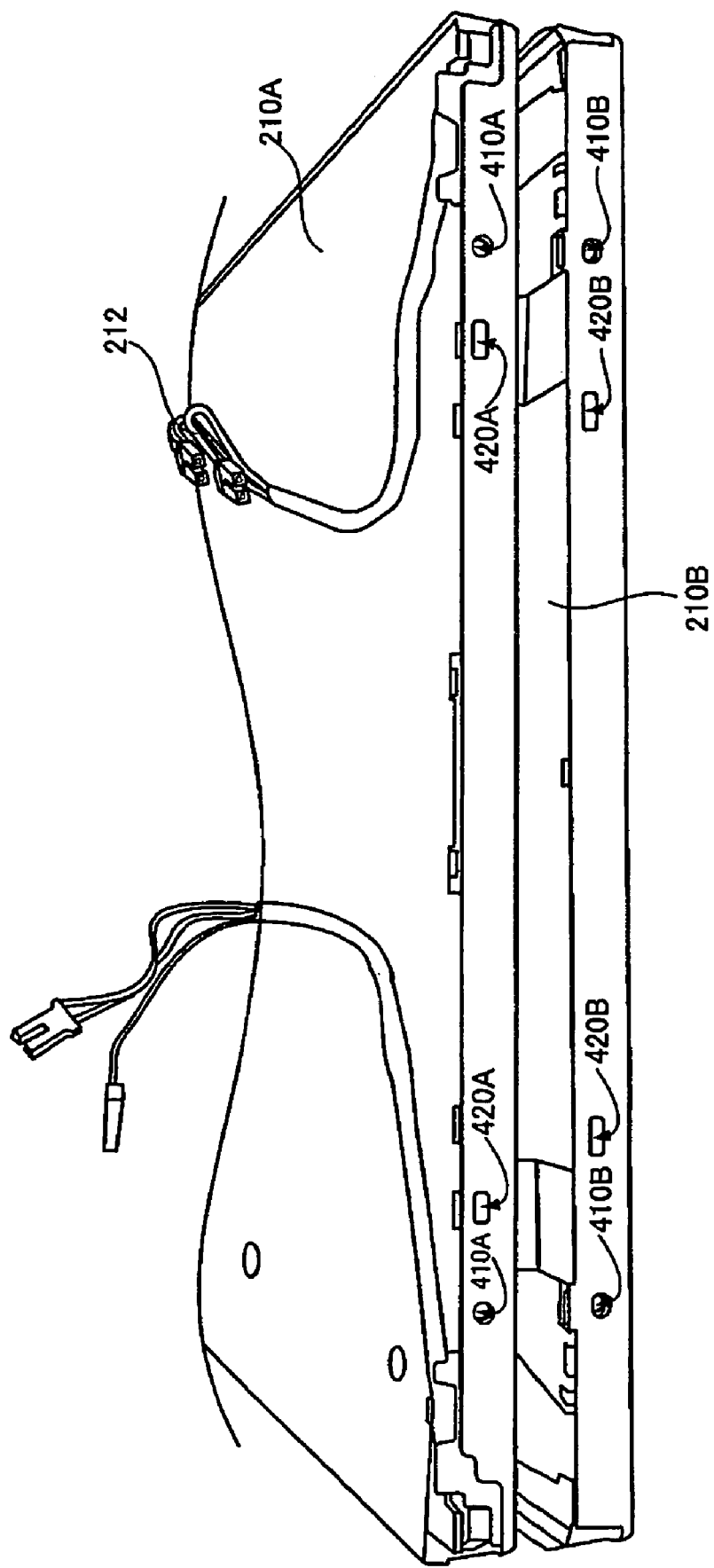
FIG. 10 is a side view of the liquid crystal panels manufactured by manufacturers different from each other.

FIG. 10 is a side view of the liquid crystal panels manufactured by manufacturers different from each other.

Side surfaces of liquid crystal panels 210A, 210B shown in FIG. 10 have screw holes 410A, 410B, respectively, to which the sheet metal member 310 shown in FIG. 8 is screwed, and have auxiliary elongated holes 420A, 420B, respectively. Depths and positions of the screw holes 410A, 410B are different from each other. The screw holes 410A, 410B correspond to an example of the screw hole according to the basic feature as described above.

Figure 11:
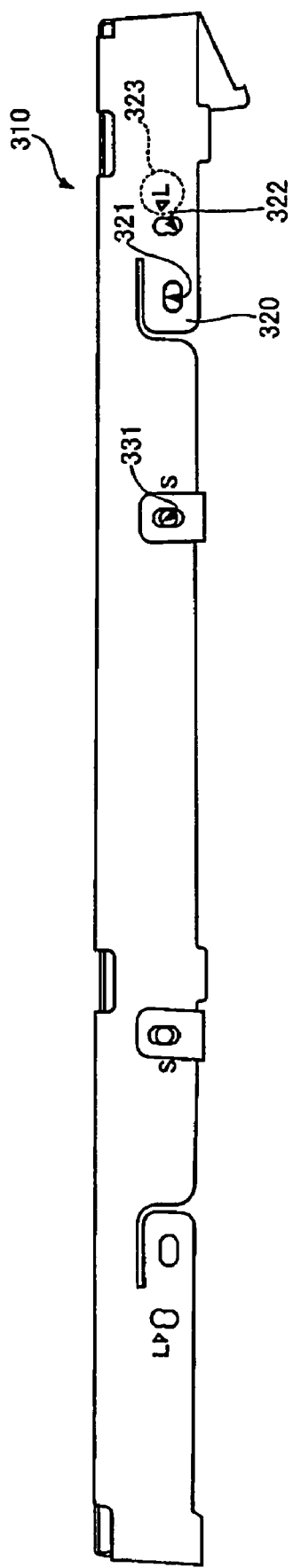
FIG. 11 is a side view of the sheet metal member.

FIG. 11 is a side view of the sheet metal member 310.

A side surface of the sheet metal member 310 is arranged with a longitudinally elongated hole 322 in which portions of two circular holes corresponding to each of the screw holes 410A, 410B of the liquid crystal panels 210A, 210B shown in FIG. 10 are overlapped, a bending piece 320 which can be bent toward the longitudinally elongated hole 322, a laterally elongated hole 321 overlapping with the circular hole of a lower side in the longitudinally elongated hole 322 when the bending piece 320 is bent, and an auxiliary through hole 331. It should be noted that a mark 323 is indicated besides the longitudinally elongated hole 322 to show that the bending piece 320 is opened. The elongated hole 322 corresponds to an example of the first through hole according to the basic feature as described above, and also corresponds to an example of "the elongated hole having the narrowed portion" according to the additional feature as described above. The bending piece 320 corresponds to an example of the bending piece according to the basic feature as described above. The laterally elongated hole 321 corresponds to an example of the second through hole according to the basic feature as described above, and also corresponds to an example of "the elongated hole having a longer axis thereof in a direction to intersect with a longer axis of the first through hole" according to the additional feature as described above.

Figure 12A:
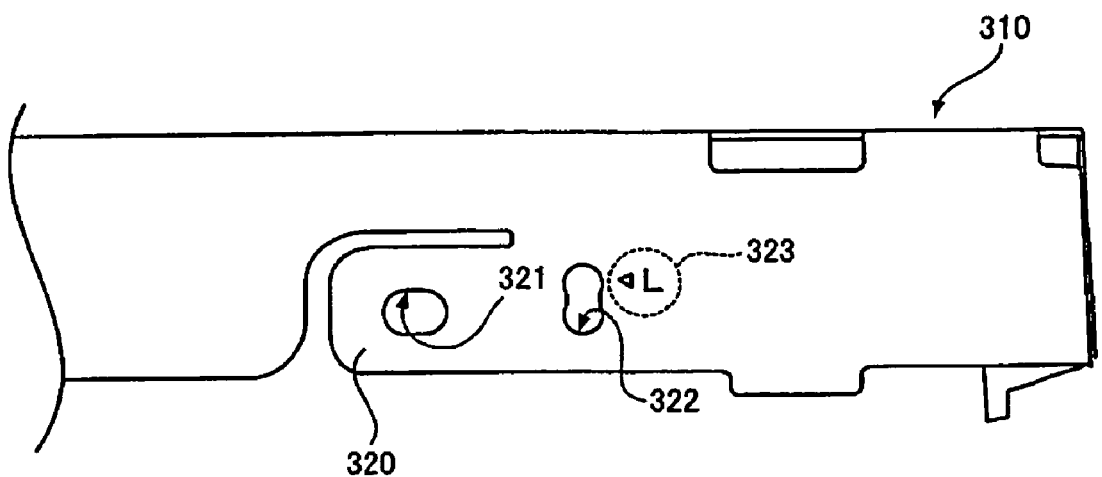
FIGS. 12(A) to (C) are enlarged views around the longitudinally elongated hole of the sheet metal member.
Figure 12B:
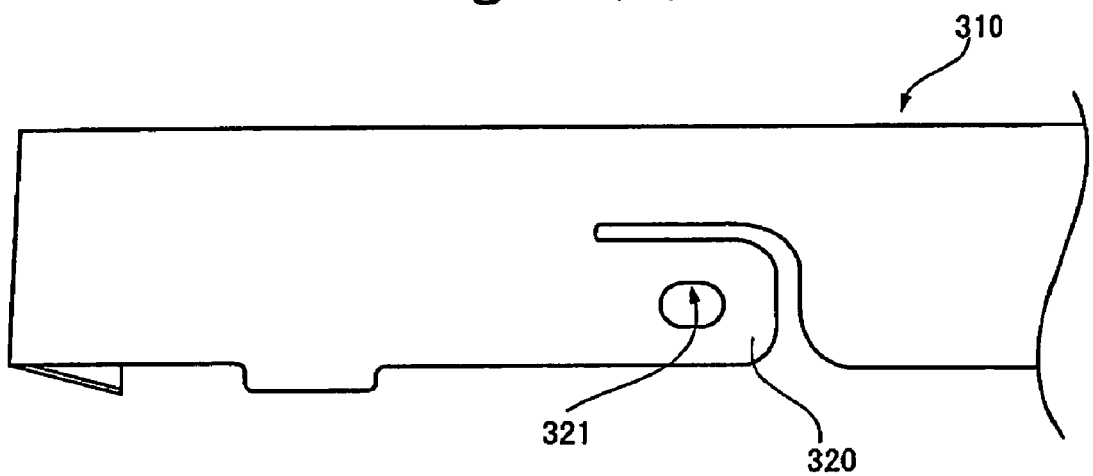
Figure 12C:
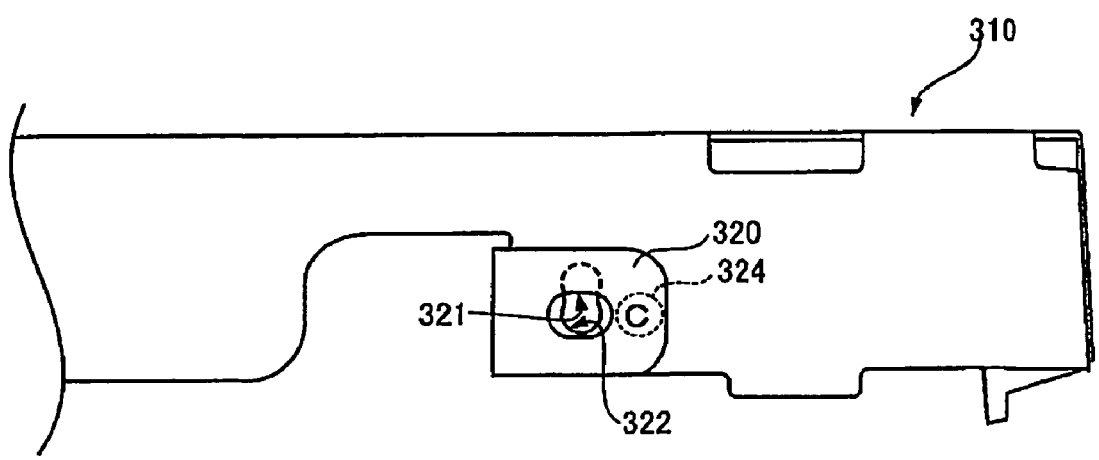

FIGS. 12(A) to (C) are enlarged views around the longitudinally elongated hole 322 of the sheet metal member 310.

FIG. 12(A) shows a surface of the sheet metal member 310 before the bending piece 320 is bent. In this state, the mark 323 showing that the bending piece 320 is opened is exposed on the surface. The mark 323 corresponds to an example of the first mark according to the additional feature as described above.

FIG. 12(B) shows a back surface of the sheet metal member 310 before the bending piece 320 is bent. Before the bending piece 320 is bent, the mark is not indicated on the back surface side of the bending piece 320.

FIG. 12(C) shows the surface of the sheet metal member 310 in a state in which the bending piece 320 is bent. When a bending processing is performed on the bending piece 320, the mark 324 showing that the bending processing has been performed is marked at such a position that the mark is exposed on the surface when the bending piece 320 is bent. The mark 324 corresponds to an example of the second mark according to the additional feature as described above. When the bending piece 320 is bent, the mark 323 shown in FIG. 12(A) is hidden by the bending piece 320. Thus, a state of the bending piece 320 can be easily recognized by checking the marks 323, 324. The laterally elongated hole 321 is arranged at such a position as to overlap with the circular hole of the lower side in the longitudinally elongated hole 322 when the bending piece 320 is bent. The bending piece 320 is arranged with the laterally elongated hole 321 having the longer axis in the direction perpendicular to the direction of the longer axis of the longitudinally elongated hole, and thus, errors caused by bending precision of the bending piece 320 can be absorbed.

In the present embodiment, one of the three display panels including the two display panels 210A, 210B shown in FIG.

10 and another display panel 210C, is mounted on the personal computer 100. In the following description, it is assumed that among the three display panels 210A, 210B, and 210C, the first display panel 210A shown at an upper portion of FIG. 10 has the deep screw hole 410A closer to an upper side, the second display panel 210B shown at a lower portion of FIG. 10 has the shallow screw hole 410B closer to a lower side, and the third display panel 210C has the screw hole whose depth and position are between those of the two display panels 210A, 210B shown in FIG. 10.

The circular hole of the upper side in the longitudinally elongated hole 322 as shown in FIGS. 12(A), (C) is arranged at such a position as to overlap with the deep screw hole 410A of the first display panel 210A. The circular hole of the lower side in the longitudinally elongated hole 322 and the laterally elongated hole 321 of the bending piece 320 overlapping with the circular hole of the lower side as shown in FIGS. 12(A), (C) are arranged at such a position as to overlap with the shallow screw hole 410B of the second display panel 210B. The auxiliary through hole 331 shown in FIG. 11 is arranged at such a position as to overlap with an auxiliary hole 420C (not shown) arranged on the third display panel 210C having the intermediate screw hole.

Figure 13:
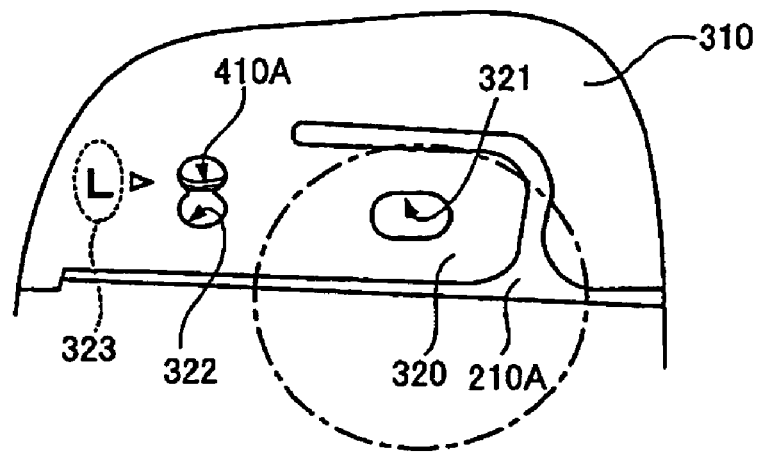
FIG. 13 is a side view of the sheet metal member attached to the first display panel having a deep screw hole.

FIG. 13 is a side view of the sheet metal member 310 attached to the first display panel 210A having the deep screw hole.

When the sheet metal member 310 is attached to the first display panel 210A, the circular hole of the upper side in the longitudinally elongated hole 322 overlaps with the screw hole 410A of the display panel 210A. In a case where the first display panel 210A is mounted, the screw hole 410A and the circular hole on the upper side in the longitudinally elongated hole 322 are screwed while the bending piece 320 is not bent so that the mark 323 showing that the bending piece 320 is opened is exposed on the surface. A step of screwing the sheet metal member 310 on the display panel 210A with the bending piece 320 opened corresponds to an example of the first screwing step according to the basic feature of the panel unit manufacturing method as described above.

Figure 14:
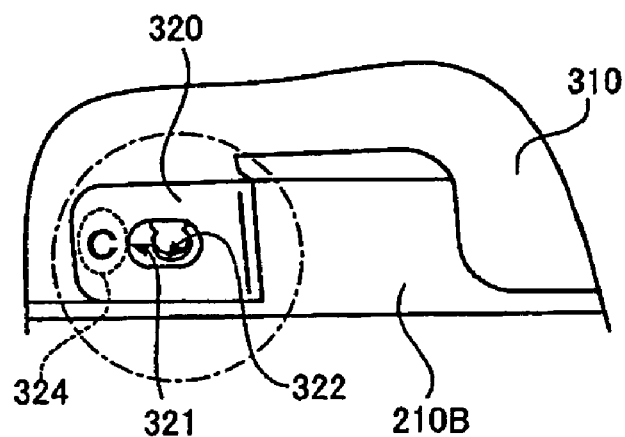
FIG. 14 is a side view of the sheet metal member attached to the second display panel having a shallow screw hole.
Figure 15:
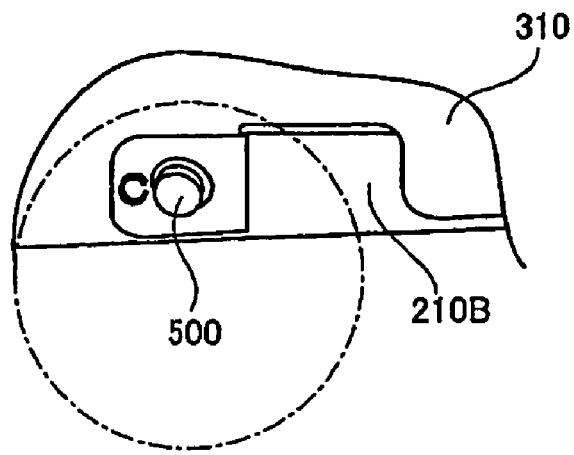
FIG. 15 is a figure showing a state in which sheet metal member shown in FIG. 14 is screwed.

FIG. 14 is a side view of the sheet metal member 310 attached to the second display panel 210B having the shallow screw hole. FIG. 15 is a figure showing a state in which the sheet metal member 310 shown in FIG. 14 is screwed.

When the sheet metal member 310 is attached to the second display panel 210B, the circular hole of the lower side of the elongated hole 322 overlaps with the screw hole 410B of the display panel 210B. In a case where the second display panel 210B is mounted, the bending piece 320 is bent, and the mark 324 showing that the bending processing has been performed is marked. A step of bending the bending piece 320 corresponds to an example of the bending processing step according to the basic feature of the panel unit manufacturing method described above.

When the bending piece 320 is bent and the screw hole 410B of the second display panel 210B, the longitudinally elongated hole 322, and the laterally elongated hole 321 of the bending piece 320 are overlapped, a screw 500 is fixed thereto using the screw hole 410B, the longitudinally elongated hole 322, and the laterally elongated hole 321 as shown in FIG. 15. A step of screwing the sheet metal member 310 with the bending piece 320 being bent corresponds to an example of the second screwing step according to the basic feature of the panel unit manufacturing method as described above.

The second display panel 210B has the shallower screw hole 410B compared with the first display panel 210A, but the screw hole 410B, the longitudinally elongated hole 322, and the laterally elongated hole 321 are overlapped to adjust the depth of the screw hole, and thus, the screw 500 common with the first display panel 210A can be used. Furthermore, one of the two circular holes constituting the longitudinally elongated hole 322 is arranged at a position corresponding to the deep screw hole 410A of the display panel 210A, and the other of the two circular holes and the laterally elongated hole 321 of the bending piece 320 are arranged at a position corresponding to the shallow screw hole 410B of the display panel 210B, so that the sheet metal member 310 can be reliably fixed to any of the liquid crystal panels 210A, 210B regardless of displacement of the screw holes 410A, 410B of these two liquid crystal panels 210A, 210B.

Regarding the display panel 210C, the sheet metal member 310 is screwed using the auxiliary through hole 331 of the sheet metal member 310 shown in FIG. 11 and the auxiliary hole 420C arranged on the third display panel 210C, and the bending piece 320 is bent and the mark 324 is marked.

Figures 16A, 16B, 16C:
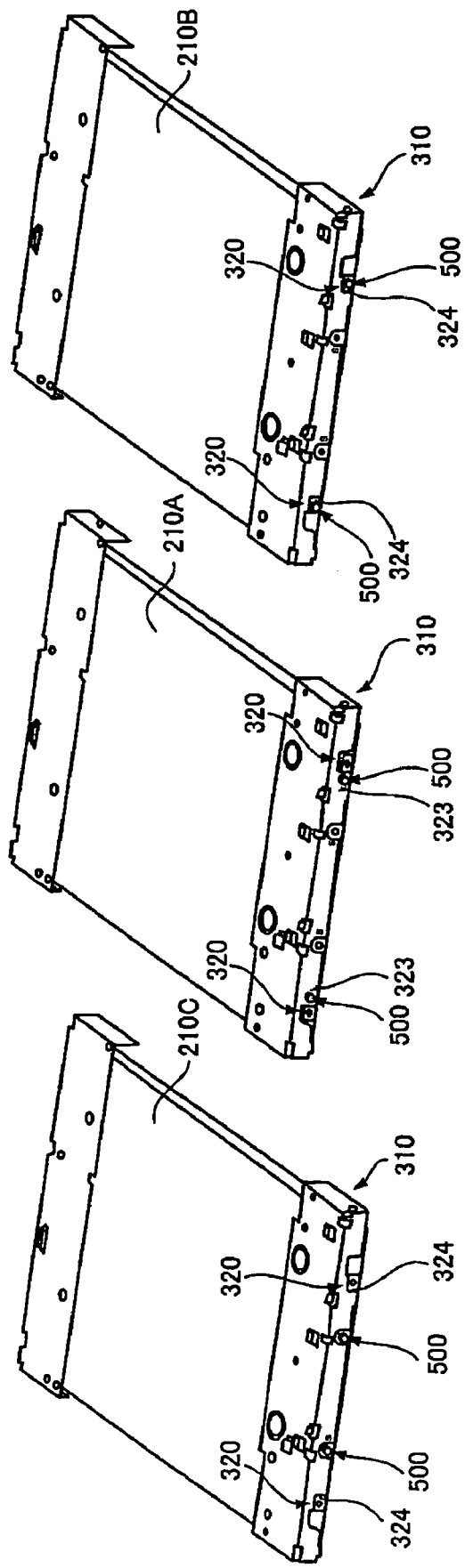
FIGS. 16(A) to (C) are figures showing the three display panels to which the sheet metal member is screwed.

FIGS. 16(A) to (C) are figures showing the three display panels 210A, 210B, and 210C to which the sheet metal member 310 is screwed.

FIG. 16(A) shows the third display panel 210C to which the sheet metal member 310 is screwed. The screw 500 is fixed to the third display panel 210C using the auxiliary through hole 331 shown in FIG. 11, and the bending piece 320 is bent so that the mark 324 showing that the bending processing has been performed is exposed. It is possible to confirm that the fact that the third display panel 210C is attached to the sheet metal member 310 by the mark 324 and the fact that the screw 500 is not fixed to the bending piece 320 marked with the mark 324.

FIG. 16(B) shows the first display panel 210A to which the sheet metal member 310 is screwed. The screw 500 is fixed to the first display panel 210 with the bending piece 320 not being bent. It is possible to confirm that the fact that the first display panel 210A is attached to the sheet metal member 310 by the mark 323 showing that the bending piece 320 is opened.

FIG. 16(C) shows the second display panel 210B to which the sheet metal member 310 is screwed. The bending piece 320 is bent and the screw 500 is fixed to the second display panel 210B. It is possible to confirm that the fact that the second display panel 210B is attached to the sheet metal member 310 by the mark 324 and the fact that the screw 500 is fixed to the bending piece 320 marked with the mark 324.

As described above, according to the present embodiment, it is possible to obtain the commonality of the screws and the sheet metal member between the multiple display panels having the screw holes whose positions and depths are different, and to suppress an increase in a production cost. Furthermore, the type of the display panel attached to the sheet metal member can be easily recognized by checking the mark, and it is possible to eliminate a failure in which the sheet metal member is fixed using wrong screw holes by mistake.

In the description described above, the personal computer is shown as an example of the information display apparatus described in "SUMMARY OF THE INVENTION". However, the information display apparatus may be any one such as a monitor for a computer, a notebook computer, a PDA, a game machine, a television, a cell phone, or the like, as long as the sheet metal member is fixed to a display panel.

In the above description, the liquid crystal display is exemplified as an example of the display panel. However, the display panel is not limited to the liquid crystal panel, and may be a plasma display, a field emission display, an organic EL display, or the like irrespective of type.

In the above description, an example is described that the mark is marked when the bending piece is bent, but the mark may be marked in advance at such a position on a back surface side of the bending piece that the mark is exposed to the surface when the bending piece is bent.

In the above description, the display panels of different manufacturers are described as an example, but it goes without saying that the sheet metal member can be used for the different product models of the display panels of a same manufacturer.

What is claimed is:

1. A sheet metal member comprising:
a first through hole formed at such a position as to be overlapped to communicate with a screw hole formed in a side surface of a panel, wherein
the sheet metal member is fixed to the panel by being screwed using the first through hole and the screw hole,
the sheet metal member further includes a bending piece in which a second through hole is formed and on which a bending processing by 180° due to plastic deformation is performed at an overlapping position where the second through hole overlaps with the first through hole; and
the sheet metal member is screwed to the panel in either of, according to a type of the panel, an opened state in which the bending processing has not yet been performed on the bending piece or a bent state in which the bending processing has been performed on the bending piece at the overlapping position.

2. The sheet metal member according to claim 1, wherein the sheet metal member has a first mark inscribed at a position where the first mark is hidden by the bending piece in the bent state.

3. The sheet metal member according to claim 1, wherein the sheet metal member has a second mark inscribed at a position of the bending piece in the bent state at which position the second mark is exposed on a surface in the bent state.

4. The sheet metal member according to claim 1, wherein the panel is a display panel having a display screen displaying information, and wherein the sheet metal member is screwed to the side surface of the panel and is a member extending on a back surface side of the display screen.

5. The sheet metal member according to claim 1, wherein the first through hole is an elongated hole in which portions of two circular holes having diameters through which screws pass are overlapped with each other, the elongated hole having a narrowed portion, at a center thereof, having a narrow width so as to block a passage of the screws, and
the second through hole is, in the bent state, is overlapped to communicate with a first circular hole that is one of the two circular holes forming the first through hole, and the bending piece covers a second circular hole that is the other thereof.

6. The sheet metal member according to claim 5, wherein the second through hole is an elongated hole having a longer axis in a direction to intersect with a longer axis of the first through hole.

7. An information display apparatus comprising:
a display panel that has a display screen displaying information and that has a screw hole formed in a side surface;
a sheet metal member that has a first through hole formed at such a position as to be overlapped to communicate with the screw hole of the display panel and that is fixed to the display panel by being screwed using the first through hole and the screw hole; and
a main body casing in which the display panel fixed to the sheet metal member is housed, wherein
the sheet metal member further includes a bending piece in which a second through hole is formed and on which a bending processing by 180° due to plastic deformation is performed at an overlapping position where the second through hole overlaps with the first through hole; and
the sheet metal member is screwed to the display panel in either of, according to a type of the display panel, an opened state in which the bending processing has not yet been performed on the bending piece or a bent state in which the bending processing is performed on the bending piece at the overlapping position.

8. The information display apparatus according to claim 7, wherein the information display apparatus has a screw commonly used for screwing the display panel in either of the opened state in which the bending processing has not yet been performed on the bending piece of the sheet metal member or the bent state in which the bending processing is performed on the bending piece at the overlapping position.

9. The information display apparatus according to claim 7, wherein the sheet metal member has a first mark inscribed at a position where the first mark is hidden by the bending piece in the bent state.

10. The information display apparatus according to claim 7, wherein the sheet metal member has a second mark inscribed at a position of the bending piece in the bent state at which position the second mark is exposed on a surface in the bent state.

11. The information display apparatus according to claim 7, wherein
the first through hole is an elongated hole in which portions of two circular holes having diameters through which screws pass are overlapped with each other, the elongated hole having a narrowed portion, at a center thereof, having a narrow width so as to block a passage of the screws, and
the second through hole, in the bent state, is overlapped to communicate with a first circular hole that is one of the two circular holes forming the first through hole, and the bending piece covers a second circular hole that is the other thereof.

12. The information display apparatus according to claim 7, wherein the second through hole is an elongated hole having a longer axis in a direction to intersect with a longer axis of the first through hole.

13. A panel unit manufacturing method of manufacturing a panel unit by screwing a panel having a screw hole formed in a side surface and a sheet metal member having a first through hole formed at such a position as to be overlapped to communicate with the screw hole of the panel, using the first through hole and the screw hole, wherein
the sheet metal member further includes a bending piece in which a second through hole is formed and on which a bending processing by 180° due to plastic deformation is performed at an overlapping position where the second through hole overlaps with the first through hole; and
according to a type of the panel, either of first-screwing or both of bending-processing and second-screwing is performed, wherein the first-screwing is screwing the sheet metal member to the panel in an opened state in which the bending processing has not yet been performed on the bending piece, the bending-processing is performing the bending processing on the bending piece at the overlapping position, and the second-screwing is screwing to the panel the sheet metal member in the bent state obtained through the bending-processing.

14. The panel unit manufacturing method according to claim 13, wherein the bending-processing is performing the bending processing on the bending piece and marking a second mark at such a position of the bending piece in the bent state at which position the second mark is exposed on a surface in the bent state.

* * * * *